US009208142B2

(12) United States Patent
Fink et al.

(10) Patent No.: US 9,208,142 B2
(45) Date of Patent: Dec. 8, 2015

(54) ANALYZING DOCUMENTS CORRESPONDING TO DEMOGRAPHICS

(71) Applicant: International Business Machines Corporation, Armonk, NY (US)

(72) Inventors: Patrick W. Fink, Charlotte, NC (US); Kristin E. McNeil, Charlotte, NC (US); Philip E. Parker, York, SC (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 13/898,060

(22) Filed: May 20, 2013

(65) Prior Publication Data

US 2014/0343921 A1    Nov. 20, 2014

(51) Int. Cl.
*G06K 9/72* (2006.01)
*G06F 17/27* (2006.01)

(52) U.S. Cl.
CPC ..................................... *G06F 17/27* (2013.01)

(58) Field of Classification Search
CPC ...................................................... G06F 17/27
USPC ........................... 382/229; 725/35, 36; 704/9
See application file for complete search history.

(56) References Cited

U.S. PATENT DOCUMENTS

| | | | |
|---|---|---|---|
| 6,604,138 B1 | 8/2003 | Virine et al. | |
| 7,752,159 B2 | 7/2010 | Nelken et al. | |
| 7,904,461 B2 | 3/2011 | Baluja et al. | |
| 8,255,948 B1 * | 8/2012 | Black et al. | 725/35 |
| 8,312,029 B2 * | 11/2012 | Snell | 707/755 |
| 8,326,627 B2 | 12/2012 | Kennewick et al. | |
| 8,346,756 B2 | 1/2013 | Polanyi et al. | |
| 8,959,102 B2 * | 2/2015 | Koll et al. | 707/765 |
| 2008/0240379 A1 | 10/2008 | Maislos et al. | |
| 2009/0319518 A1 | 12/2009 | Koudas et al. | |
| 2010/0114562 A1 | 5/2010 | Hutchinson et al. | |
| 2010/0125502 A1 * | 5/2010 | Solomon et al. | 705/14.52 |
| 2011/0060645 A1 * | 3/2011 | Sweeney | 705/14.43 |
| 2011/0106829 A1 | 5/2011 | Pradhan et al. | |
| 2011/0145250 A1 | 6/2011 | Spaggiari | |
| 2011/0179116 A1 | 7/2011 | Solomon et al. | |
| 2011/0184960 A1 * | 7/2011 | Delpha et al. | 707/754 |
| 2011/0191372 A1 | 8/2011 | Kaushansky et al. | |
| 2012/0136959 A1 | 5/2012 | Kadam et al. | |
| 2012/0179972 A1 | 7/2012 | Hacid et al. | |
| 2012/0233558 A1 * | 9/2012 | Naim et al. | 715/760 |
| 2012/0233631 A1 * | 9/2012 | Geshwind | 725/1 |
| 2013/0097166 A1 * | 4/2013 | Fink et al. | 707/737 |
| 2013/0124193 A1 * | 5/2013 | Holmberg | 704/9 |

(Continued)

*Primary Examiner* — Gregory M Desire
(74) *Attorney, Agent, or Firm* — Daniel R. Simek (57) ABSTRACT

Embodiments of the present invention disclose a method, computer program product, and system for analyzing documents corresponding to demographics. A computer determines whether a first text analysis algorithm corresponds to a demographic of a document, wherein Natural Language Processing (NLP) utilizes text analysis algorithms to produce an analysis of the document and provide annotations. Responsive to determining that the first text analysis algorithm does correspond to the demographic of the document, the computer analyzes the document utilizing the determined corresponding first text analysis algorithm. In another embodiment, the computer determines whether a second text analysis algorithm is available. Responsive to determining that a second text analysis algorithm is not available, the computer provides information from the analysis of the document utilizing one or more text analysis algorithms.

17 Claims, 3 Drawing Sheets

(56) References Cited

U.S. PATENT DOCUMENTS

2013/0144605 A1* 6/2013 Brager et al. .................. 704/9
2013/0318104 A1* 11/2013 Nair ............................ 707/750
2014/0136185 A1* 5/2014 Bhatt ............................ 704/9

* cited by examiner

ANALYZING DOCUMENTS CORRESPONDING TO DEMOGRAPHICS

FIELD OF THE INVENTION

The present invention relates generally to the field of text analysis, and more particularly to analyzing documents corresponding to demographics.

BACKGROUND OF THE INVENTION

Text analysis of documents is a growing area of importance for organizations having a large number of documents. Organizations can utilize text analysis in an effort to derive valuable information from large pools of unstructured content. Natural Language Processing (NLP) is becoming an important aspect of text and document analysis, allowing valuable information to be gathered from documents written by authors of various demographics. A demographic of an author (i.e. location, age group, gender, etc.) can provide important information corresponding to a writing style of the author that can be utilized in text and document analysis. In text analysis, annotator algorithms are used to extract information from a document and provide annotations corresponding to text in the document. Documents can be processed by multiple different annotator algorithms utilized to analyze different types of data (i.e. annotator algorithms corresponding to different author demographics). Annotator algorithms correspond to certain word lists and rules that can be demographic specific (i.e. corresponding to speech patterns of authors form different demographics).

SUMMARY

Embodiments of the present invention disclose a method, computer program product, and system for analyzing documents corresponding to demographics. A computer determines whether a first text analysis algorithm corresponds to a demographic of a document, wherein Natural Language Processing (NLP) utilizes text analysis algorithms to produce an analysis of the document and provide annotations. Responsive to determining that the first text analysis algorithm does correspond to the demographic of the document, the computer analyzes the document utilizing the determined corresponding first text analysis algorithm. In another embodiment, the computer determines whether a second text analysis algorithm is available. Responsive to determining that a second text analysis algorithm is not available, the computer provides information from the analysis of the document utilizing one or more text analysis algorithms.

DETAILED DESCRIPTION

Exemplary embodiments of the present invention allow for analysis of text in a document using annotator algorithms that correspond to a determined demographic of the document. In one embodiment, annotator algorithms are compared to the determined demographic of the document, and annotator algorithms that correspond to the determined demographic of the document analyze the document and provide annotations.

Embodiments of the present invention recognize that a word or term can have different meanings based on an author demographic. Many organizations utilize text analysis to extract and understand information from text documents. Utilizing text analysis techniques that can take into account demographics of document authors can lead to more accurate annotations and improved analysis of document text.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
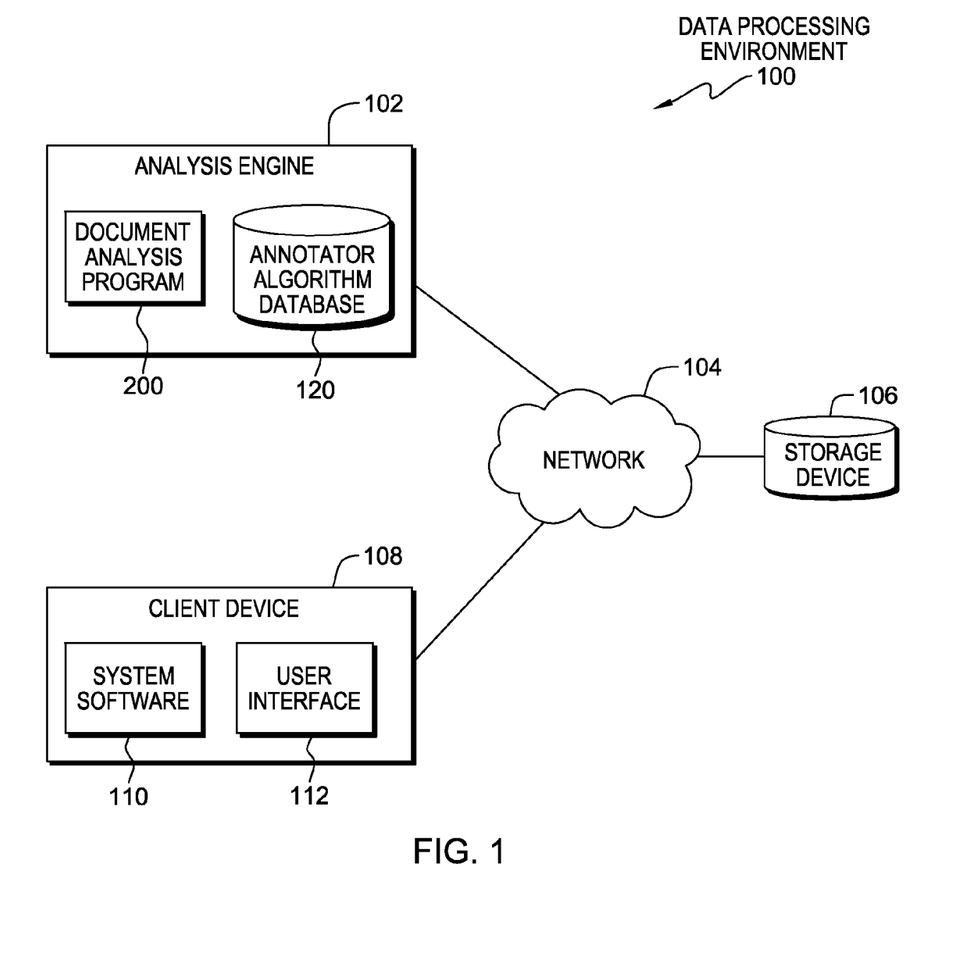
FIG. 1 is a functional block diagram of a data processing environment in accordance with an embodiment of the present invention.

The present invention will now be described in detail with reference to the Figures. FIG. 1 is a functional block diagram illustrating data processing environment 100, in accordance with one embodiment of the present invention.

An exemplary embodiment of data processing environment 100 includes analysis engine 102, network 104, storage device 106 and client device 108. In one embodiment, analysis engine 102 accesses and analyzes data on storage device 106 through network 104. In exemplary embodiments, analysis engine 102 can be a desktop computer, a computer server, or any other computer systems known in the art. In certain embodiments, analysis engine 102 represents a computer system utilizing clustered computers and components (e.g., database server computers, application server computers, etc.) that act as a single pool of seamless resources when accessed by elements of data processing environment 100. In general, analysis engine 102 is representative of any electronic device or combination of electronic devices capable of executing machine-readable program instructions, as described in greater detail with regard to FIG. 3. In exemplary embodiments, analysis engine 102 includes annotator algorithm database 120 and document analysis program 200. In one embodiment, annotator algorithm database 120 stores annotator algorithms that analysis engine 102 utilizes with document analysis program 200 to analyze and provide annotations on documents in storage device 106. In exemplary embodiments, annotator algorithms in annotator algorithm database 120 are associated with Natural Language Processing (NLP), and can analyze documents corresponding to authors of differing demographics.

Annotator algorithm database 120 can include any number of annotator algorithms that correspond to different types of annotations. For example, annotator algorithms provide annotations that label sequences of text in terms of the role of the sequences of text in a document (i.e., word, sentence, paragraph, etc.), or to describe text in terms of grammatical role (i.e., noun, noun phrase, verb, adjective, etc.). Other examples include annotating segments of document text to identify proper names, locations, times, events, dates, descriptions, or other items of significance or interest. Annotator algorithm database 120 can be implemented with any type of storage device that is capable of storing data that may be accessed and utilized by analysis engine 102, such as a database server, a hard disk drive, or flash memory. In other embodiments, annotator algorithm database 120 can represent multiple storage devices within analysis engine 102. Analysis engine 102 utilizes annotator algorithms stored in algorithm database 120 to process a document and provide annotations corresponding to text in the document. In exemplary embodiments, annotator algorithm database 120 includes data associated with annotator algorithms (i.e. a demographic score corresponding to an annotator algorithm). In one embodiment, annotator algorithm database 120 includes a pool of annotator algorithms that analysis engine 102 utilizes (through document analysis program 200) to analyze documents on storage device 106. In exemplary embodiments, document analysis program 200 analyzes documents in storage device 106 with annotator algorithms from annotator algorithm database 120 that correspond to a demographic of the document. Document analysis program 200 is discussed in greater detail with regard to FIG. 2.

In one embodiment, analysis engine 102, storage device 106, and client device 108 communicate through network 104. Network 104 can be, for example, a local area network (LAN), a telecommunications network, a wide area network (WAN) such as the Internet, or a combination of the three, and include wired, wireless, or fiber optic connections. In general, network 104 can be any combination of connections and protocols that will support communications between analysis engine 102, storage device 106, and client device 108 in accordance with exemplary embodiments of the present invention.

In exemplary embodiments, an individual utilizing client device 108 is an author of documents that are stored on storage device 106. In various embodiments of the present invention, client device 108 may be a workstation, personal computer, personal digital assistant, mobile phone, or any other device capable of executing program instructions. In general, client device 108 is representative of any electronic device or combination of electronic devices capable of executing machine-readable program instructions, as described in greater detail with regard to FIG. 3. Client device 108 includes systems software 110 and user interface 112. In one embodiment, system software 110 may exist in the form of operating system software, which may be Windows®, LINUX®, and other application software such as internet applications and web browsers. User interface 112 allows an individual utilizing client device 108 to input information and author documents that can be stored on storage device 106.

In exemplary embodiments, storage device 106 stores documents and data associated with the documents. The documents in storage device 106 can include text documents of various formats, such as but not limited to: (HyperText Markup Language (HTML), Portable Document Format (PDF), Extensible Markup Language (XML), etc), websites, Electronic Mail (Email), blog posts, etc. The stored data associated with the documents includes document authors (i.e. client device 108), and demographics of the documents and corresponding authors. Storage device 106 can be implemented with any type of storage device that is capable of storing data that may be accessed and utilized by analysis engine 102 and client device 108, such as a database server, a hard disk drive, or flash memory. In other embodiments, storage device 106 can represent multiple storage devices within data processing environment 100.

In exemplary embodiments, documents in storage device 106 include associated data indicating a demographic of the document author, and annotator algorithms in annotator algorithm database 120 include associated data indicating a demographic score of the annotator algorithm. The demographic data of a document author includes a profile corresponding to the demographic of the document author (i.e. age range, location, gender, education level, etc) that demographic scores of the annotator algorithms can be compared to. For example, an individual utilizing client device 108 authors a document that is stored in storage device 106. Text analysis can be performed on the document to determine a demographic of the document author. Each annotator algorithm in annotator algorithm database 120 has an associated demographic score indicating which author demographic the annotator algorithm is suited to analyze. Demographic scores correspond to one or more demographic profiles, and indicate that an annotator algorithm is suited to analyze documents from an author of a determined demographic.

Figure 2:
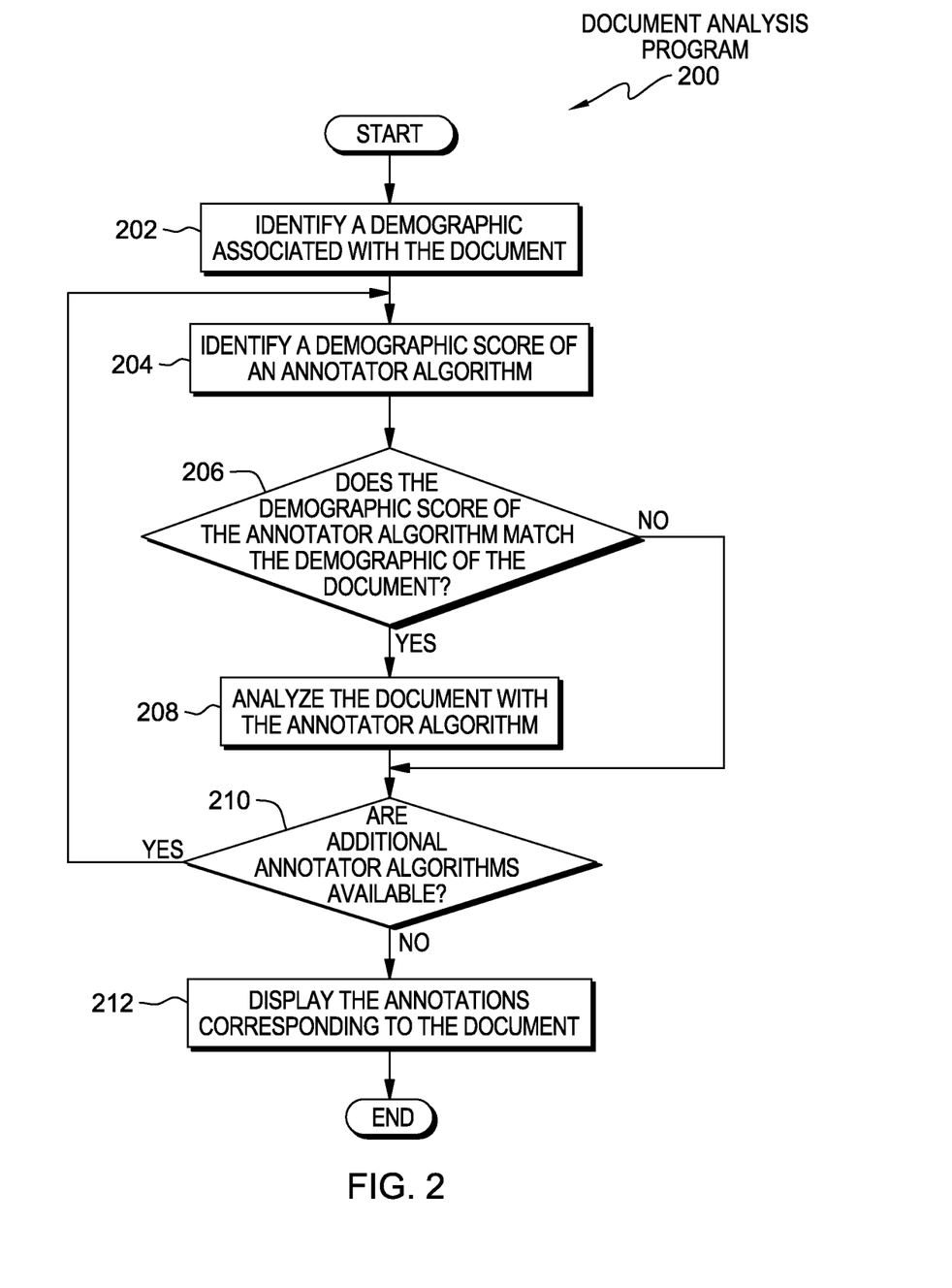
FIG. 2 is a flowchart depicting operational steps of a program for analyzing documents with annotator algorithms that correspond to a demographic of the document in accordance with an embodiment of the present invention.

FIG. 2 is a flowchart depicting operational steps of document analysis program 200 in accordance with an exemplary embodiment of the present invention. In one embodiment, document analysis program 200 initiates to analyze a document stored in storage device 106. In an example, document analysis program 200 initiates responsive to analysis engine 102 receiving an indication to analyze a document on storage device 106. In exemplary embodiments, document analysis program 200 utilizes annotator algorithms on annotator algorithm database 120 to analyze documents on storage device 106 that have associated demographic data.

In step 202, document analysis program 200 identifies a demographic associated with the document. In one embodiment, document analysis program 200 identifies the demographic profile associated with the document stored on storage device 106. As previously discussed with regard to FIG. 1, documents stored in storage device 106 include associated data indicating demographics of the documents and corresponding authors.

In step 204, document analysis program 200 identified a demographic score of an annotator algorithm. In one embodiment, document analysis program 200 identifies the demographic score of a first annotator algorithm in annotator algorithm database 120. As previously discussed with regard to FIG. 1, annotator algorithms database 120 includes a pool of annotator algorithms that document analysis program 200 can utilize, and a corresponding demographic score for each annotator algorithm. In another embodiment, document analysis program 200 repeats step 204 for each annotator algorithm in annotator algorithm database 120 (further discussed with regard to step 210).

In decision step 206, document analysis program 200 determines whether the demographic score of the annotator algorithm matches the demographic of the document. In one embodiment, document analysis program 200 compares the demographic score of the annotator algorithm (identified in step 204) to the demographic of the document (identified in step 202). In exemplary embodiments, the demographic of the document includes a range of demographic scores of annotator algorithms. Demographic scores of annotator algorithms can match one or more demographic profiles of documents, and demographic profiles of documents can correspond to a range of demographic scores that includes one or more annotator algorithms. For example, a document in storage device 106 is written in English using the DD/MM/YYYY (Day/Month/Year) date format. The identified associated demographic of the document author (i.e. client device 108) indicates that the document author utilizes this date format. In this example, in step 204 document analysis program 200 identified a demographic score of an annotator algorithm that utilizes the DD/MM/YYYY date format. Regarding this example in decision step 206, document analysis program 200 determines that the demographic score of the annotator algorithm is within the range associated with the demographic of the document. Therefore, document analysis program 200 determines that the demographic score of the annotator algorithm matches the demographic of the document. In another example, in step 204 document analysis program 200 identified a demographic score of an annotator algorithm that utilizes the MM/DD/YYYY (Month/Day/Year) date format. In this example, document analysis program 200 determines that the demographic score of the document is not within the range associated with the demographic of the document using the DD/MM/YYYY date format. Therefore, document analysis program 200 determines that the demographic score of the annotator algorithm does not match the demographic of the document.

In step 208, document analysis program 200 analyzes the document with the annotator algorithm. In one embodiment, responsive to determining that the demographic score of an annotator algorithm matches the demographic of a document, document analysis program 200 analyzes the document with the annotator algorithm. In exemplary embodiments, document analysis program 200 utilizes the annotator algorithm as part of an analysis pipeline such as Unstructured Information Management Architecture (UIMA) for Natural Language Processing (NLP) to analyze the document according the identified demographic. In the previously discussed example with regard to the demographic score of the annotator algorithm matching the demographic of the document, document analysis program 200 analyzes the document with the matching annotator algorithm. In this example, the annotator algorithm analyzes the document and is able to correctly interpret the date in the document (in the DD/MM/YYYY date format).

In decision step 210, document analysis program 200 determines whether additional annotator algorithms are available. In one embodiment, document analysis program 200 determines whether document analysis program 200 has utilized all available annotator algorithms in annotator algorithm database 120. In exemplary embodiments, decision step 210 initiates after document analysis program 200 analyzes a document with an annotator algorithm (step 208), or responsive to document analysis program 200 determining that the demographic score of an annotator algorithm does not match the demographic of a document (no branch of decision step 206). In an example, document analysis program 200 determines that additional algorithms are available in annotator algorithm database 120. In this example, document analysis program 200 repeats step 204 and identifies a demographic score of a next annotator algorithm in annotator algorithm database 120. In exemplary embodiments, decision step 210 ensures that document analysis program 200 processes each annotator algorithm in annotator algorithm database 120, and therefore the document is processed by all annotator algorithms that correspond to the demographic of the document.

In step 212, document analysis program 200 displays the annotations corresponding to the document. In one embodiment, responsive to determining that there are no additional annotator algorithms in annotator algorithm database 120, document analysis program 200 displays the annotations from annotator algorithms corresponding to the demographic of the document. With regard to the previously discussed example of the annotator algorithm utilizing DD/MM/YYYY date format, document analysis program 200 displays the annotations created by that annotator algorithm analyzing the document (in step 208), and all annotations associated with additional annotator algorithms that corresponding to the demographic of the document. In exemplary embodiments, document analysis program 200 displays the annotations corresponding to the document, and stores the annotations corresponding to the document (i.e. in storage device 106) associated with the document. In another embodiment, the information from the annotator algorithm(s) analyzing the document (in step 208) is stored (i.e. in storage device 106), allowing for subsequent usage.

Figure 3:
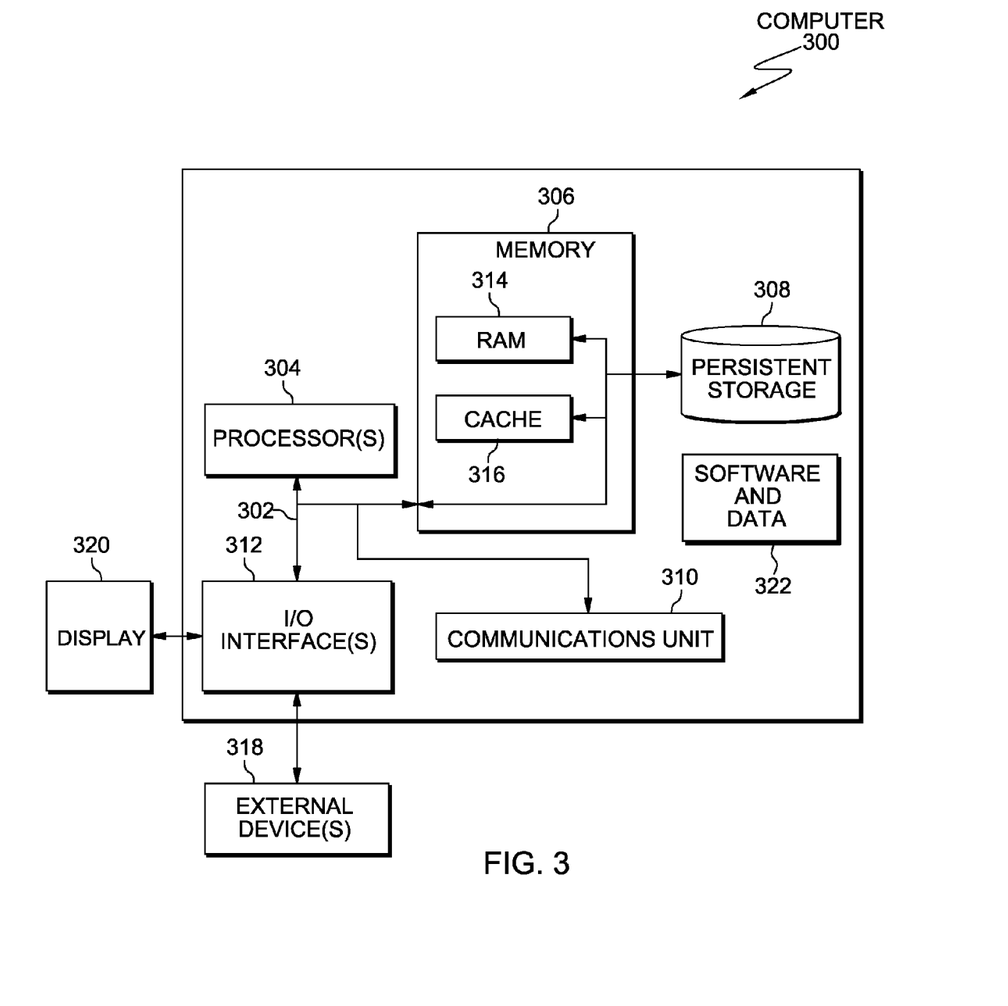
FIG. 3 depicts a block diagram of components of the computing system of FIG. 1 in accordance with an embodiment of the present invention.

FIG. 3 depicts a block diagram of components computer 300, which is representative of analysis engine 102 and client device 108 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media. Software and data 322 stored in persistent storage 308 for access and/or execution by processor(s) 304 via one or more memories of memory 306. With respect to analysis engine 102, software and data 322 includes document analysis program 200. With respect to client device 108, software and data 322 includes system software 110.

In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data 322 can be stored on such portable computer-readable storage media and can be loaded onto persistent storage 308 via I/O interface(s) 312. I/O interface(s) 312 also can connect to a display 320.

Display 320 provides a mechanism to display data to a user and may be, for example, a computer monitor. Display 320 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for analyzing documents corresponding to demographics, the method comprising:
   a computer determining whether demographic information associated with a first text analysis algorithm indicates that the first text analysis algorithm is intended to analyze a document based on demographic information associated with the document, wherein Natural Language Processing (NLP) utilizes text analysis algorithms to produce an analysis of the document and provide annotations;
   wherein the demographic information associated with the first text analysis algorithm is a demographic score that indicates a relationship to one or more demographic profiles, and the demographic information associated with the document is a demographic profile of an author of the document;

responsive to determining that demographic information associated with the first text analysis algorithm does indicate that the first text analysis algorithm is intended to analyze the document, the computer analyzing the document utilizing the first text analysis algorithm; and the computer generating a set of annotations for the document based on the analysis of the document utilizing the first text analysis algorithm.

2. The method of claim 1, further comprising:

the computer determining whether a second text analysis algorithm is available; and responsive to determining that a second text analysis algorithm is not available, the computer providing information from the analysis of the document utilizing one or more text analysis algorithms.

3. The method of claim 2, wherein the providing information from the analysis of the document utilizing one or more text analysis algorithms includes:

the computer initiating display of the provided information from the analysis of the document; and the computer storing the provided information from the analysis of the document.

4. The method of claim 1, wherein the computer analyzing the document utilizing the first text analysis algorithm includes:

the computer analyzing the document with the determined corresponding first text analysis algorithm utilizing Natural Language Processing (NLP).

5. The method of claim 1, wherein determining whether demographic information associated with a first text analysis algorithm indicates that the first text analysis algorithm is intended to analyze a document based on demographic information associated with the document comprises:

the computer determining whether the demographic score of the first text analysis algorithm corresponds to at least one demographic profile of an author of the document.

6. The method of claim 1, further comprising:

the computer determining whether a second text analysis algorithm is available;

responsive to determining that a second text analysis algorithm is available, the computer determining whether demographic information associated with the second text analysis algorithm indicates that the second text analysis algorithm is intended to analyze the document based on demographic information associated with the document; and responsive to determining that demographic information associated with the second text analysis algorithm does indicate that the second text analysis algorithm is intended to analyze the document, the computer analyzing the document utilizing the second text analysis algorithm.

7. The method of claim 1, wherein the demographic profile of an author of the document indicates information about the author of the document comprising one or more of: an age range of the author, a nationality of the author, a location of the author, and an education level of the author.

8. A computer program product for analyzing documents corresponding to demographics, the computer program product comprising:

one or more computer-readable storage media and program instructions stored on the one or more computer-readable storage media, the program instructions comprising:

program instructions to determine whether demographic information associated with a first text analysis algorithm indicates that the first text analysis algorithm is intended to analyze a document based on demographic information associated with the document, wherein Natural Language Processing (NLP) utilizes text analysis algorithms to produce an analysis of the document and provide annotations;

wherein the demographic information associated with the first text analysis algorithm is a demographic score that indicates a relationship to one or more demographic profiles, and the demographic information associated with the document is a demographic profile of an author of the document;

responsive to determining that demographic information associated with the first text analysis algorithm does indicate that the first text analysis algorithm is intended to analyze the document, program instructions to analyze the document utilizing the first text analysis algorithm; and program instructions to generate a set of annotations for the document based on the analysis of the document utilizing the first text analysis algorithm.

9. The computer program product of claim 8, further comprising program instructions to:

determine whether a second text analysis algorithm is available; and responsive to determining that a second text analysis algorithm is not available, provide information from the analysis of the document utilizing one or more text analysis algorithms.

10. The computer program product of claim 9, wherein the program instructions to provide information from the analysis of the document utilizing one or more text analysis algorithms include program instructions to:

initiate display of the provided information from the analysis of the document; and store the provided information from the analysis of the document.

11. The computer program product of claim 8, wherein the program instructions to determine whether demographic information associated with a first text analysis algorithm indicates that the first text analysis algorithm is intended to analyze a document based on demographic information associated with the document, comprise program instructions to:

determine whether the demographic score of the first text analysis algorithm corresponds to at least one demographic profile of an author of the document.

12. The computer program product of claim 8, wherein the demographic profile of an author of the document indicates information about the author of the document comprising one or more of: an age range of the author, a nationality of the author, a location of the author, and an education level of the author.

13. A computer system for analyzing documents corresponding to demographics, the computer system comprising:

one or more computer processors; and one or more computer-readable storage media;

program instructions stored on the computer-readable storage media for execution by at least one of the one or more processors, the program instructions comprising:

program instructions to determine whether demographic information associated with a first text analysis algorithm indicates that the first text analysis algorithm is intended to analyze a document based on demographic information associated with the document, wherein Natural Language Processing (NLP) utilizes text analysis algorithms to produce an analysis of the document and provide annotations;

wherein the demographic information associated with the first text analysis algorithm is a demographic score that indicates a relationship to one or more demographic profiles, and the demographic information associated with the document is a demographic profile of an author of the document;

responsive to determining that demographic information associated with the first text analysis algorithm does indicate that the first text analysis algorithm is intended to analyze the document, program instructions to analyze the document utilizing the first text analysis algorithm; and program instructions to generate a set of annotations for the document based on the analysis of the document utilizing the first text analysis algorithm.

14. The computer system of claim 13, further comprising program instructions to:

determine whether a second text analysis algorithm is available; and responsive to determining that a second text analysis algorithm is not available, provide information from the analysis of the document utilizing one or more text analysis algorithms.

15. The computer system of claim 14, wherein the program instructions to provide information from the analysis of the document utilizing one or more text analysis algorithms include program instructions to:

initiate display of the provided information from the analysis of the document; and store the provided information from the analysis of the document.

16. The computer system of claim 13, wherein the program instructions to determine whether demographic information associated with a first text analysis algorithm indicates that the first text analysis algorithm is intended to analyze a document based on demographic information associated with the document, comprise program instructions to:

determine whether the demographic score of the first text analysis algorithm corresponds to at least one demographic profile of an author of the document.

17. The computer system of claim 13, wherein the demographic profile of an author of the document indicates information about the author of the document comprising one or more of: an age range of the author, a nationality of the author, a location of the author, and an education level of the author.

* * * * *